(12) United States Patent
Baskey et al.

(10) Patent No.: US 7,089,294 B1
(45) Date of Patent: Aug. 8, 2006

(54) METHODS, SYSTEMS AND COMPUTER PROGRAM PRODUCTS FOR SERVER BASED TYPE OF SERVICE CLASSIFICATION OF A COMMUNICATION REQUEST

(75) Inventors: Michael Edward Baskey, Wappingers Falls, NY (US); Roy Frank Brabson, Raleigh, NC (US); Lap Thiet Huynh, Apex, NC (US); Peter Bergersen Yocom, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 09/693,268

(22) Filed: Oct. 20, 2000

Related U.S. Application Data

(63) Continuation-in-part of application No. 09/645,651, filed on Aug. 24, 2000.

(51) Int. Cl.
*G06F 15/16* (2006.01)

(52) U.S. Cl. ............... 709/219; 709/203; 709/218; 709/228; 709/229; 719/324

(58) Field of Classification Search ............... 709/203, 709/223, 218–219, 220, 225–226, 228–229, 709/232, 240, 237, 250, 324; 455/422.1; 370/235; 719/324
See application file for complete search history.

(56) References Cited

U.S. PATENT DOCUMENTS

| | | | |
|---|---|---|---|
| 4,403,286 A | 9/1983 | Fry et al. | |
| 4,495,570 A | 1/1985 | Kitajima et al. | |
| 4,577,272 A | 3/1986 | Ballew et al. | |
| 5,031,089 A | 7/1991 | Liu et al. | |
| 5,515,508 A | 5/1996 | Pettus et al. | |
| 5,548,723 A | 8/1996 | Pettus | |
| 5,563,878 A | 10/1996 | Blakeley et al. | |
| 5,675,739 A | 10/1997 | Eilert et al. | |
| 5,787,019 A * | 7/1998 | Knight et al. | 719/324 |
| 5,812,768 A * | 9/1998 | Page et al. | 709/228 |
| 5,917,997 A | 6/1999 | Bell et al. | |
| 5,923,854 A | 7/1999 | Bell et al. | |
| 5,935,215 A | 8/1999 | Bell et al. | |
| 5,951,650 A | 9/1999 | Bell et al. | |
| 6,006,264 A * | 12/1999 | Colby et al. | 709/226 |
| 6,038,603 A * | 3/2000 | Joseph | 709/228 |
| 6,169,748 B1 | 1/2001 | Barbas et al. | |

(Continued)

OTHER PUBLICATIONS

Internet draft entitled "Policy Core LDAP Schema," draft-IETF-policy-core-schema-07.txt, Jul. 14, 2000 ("IETF proposal").

(Continued)

*Primary Examiner*—Saleh Najjar
*Assistant Examiner*—ThuHa Nguyen
(74) *Attorney, Agent, or Firm*—Myers Bigel Sibley & Sajovec

(57) ABSTRACT

Methods, systems and computer program products are provided for type of service classification of a communication request for an application executing on a server. An application plug-in associated with the application is provided in an operating system kernel of the server. The application plug-in receives the communication request and obtains application level information from the received communication request. The application plug-in further assigns a type of service classification to the received communication request based on the obtained application level information and provides the assigned type of service classification information for the communication request to a process executing on the server for processing communications from the server responsive to the communication request.

43 Claims, 5 Drawing Sheets

U.S. PATENT DOCUMENTS

| | | | |
|---|---|---|---|
| 6,185,221 B1 | 2/2001 | Aybay | |
| 6,212,546 B1* | 4/2001 | Starkovich et al. | 709/203 |
| 6,253,248 B1* | 6/2001 | Nakai et al. | 709/237 |
| 6,389,479 B1 | 5/2002 | Boucher et al. | |
| 6,442,553 B1 | 8/2002 | Take | |
| 6,449,647 B1* | 9/2002 | Colby et al. | 709/226 |
| 6,493,813 B1 | 12/2002 | Brandin et al. | |
| 6,542,488 B1 | 4/2003 | Walton et al. | |
| 6,553,413 B1* | 4/2003 | Leighton et al. | 709/219 |
| 6,556,824 B1 | 4/2003 | Purnadi et al. | |
| 6,556,982 B1 | 4/2003 | McGaffey et al. | |
| 6,594,699 B1* | 7/2003 | Sahai et al. | 709/228 |
| 6,625,689 B1 | 9/2003 | Narad et al. | |
| 6,631,122 B1 | 10/2003 | Arunachalam et al. | |
| 6,658,480 B1 | 12/2003 | Boucher et al. | |
| 6,678,518 B1* | 1/2004 | Eerola | 455/422.1 |
| 6,690,929 B1 | 2/2004 | Yeh | |
| 6,697,849 B1* | 2/2004 | Carlson | 709/219 |
| 6,700,809 B1 | 3/2004 | Ng et al. | |
| 6,718,809 B1 | 4/2004 | Utyashev et al. | |
| 2002/0019879 A1* | 2/2002 | Jasen et al. | 709/240 |
| 2002/0091802 A1* | 7/2002 | Paul et al. | 709/220 |
| 2002/0124100 A1* | 9/2002 | Adams | 709/232 |
| 2002/0152307 A1* | 10/2002 | Doyle et al. | 709/225 |
| 2003/0191829 A1* | 10/2003 | Masters et al. | 709/223 |

OTHER PUBLICATIONS

Hash Tables, *Introduction to Algorithms,* by T.H. Cormen, C.E. Leiserson and R.L. Rivest; Chapter 12, MIT Press, 1990.

URL Forwarding and Compression in Adaptive Web Caching, *Proceeding IEEE INFOCOM 2000*; by B.S. Michel, et al., vol. 2, P.670-678.

Mac Devine. Presentation entitled, *TCP/IP Application Availability and Workload Balancing in the Parallel Sysplex.* Share Technical Conference (Aug. 22-27, 1999).

"Allot Announces the General Availability of its Directory Services-Based NetPolicy™ Manager." Press Bulletin. Tel Aviv, Israel, Feb. 28, 2000.

"Allot Communications Announces Business-Aware Network Policy Manager." Press Bulletin. Sophia Antipolis, France, Sep. 20, 1999.

"Allot Communications Announces Directory Services Based Network Policy Manager." Press Bulletin. Los Gatos, CA, Apr. 5, 1999.

"Allot Communications Announces the NetEnforcer Family of IP Traffic Management Products: Fault-Tolerant, Scaleable, Policy-Based Bandwidth Management, QOS, SLA Solutions." Press Bulletin. Bulingame, CA, Dec. 13, 1999.

"Allot Communications Launches NetEnforcer with NetWizard, the Fastest Way to Implement Accurate and Reliable Network QOS Policies." Press Bulletin. Burlingame, CA, Jan. 25, 2001.

"Allot Introduces Turnkey Next Generation IP Service and Creation Solution-the Virtual Bandwidth Manager." Press Bulletin. Atlanta, GA, SUPERCOMM 2000, Booth #8458, Jun. 5, 2000.

"Data Communications Awards Allot Communications 'Hot Producer' in Internetworking/IP Tools Category." Press Bulletin. Los Gatos, CA, Jan. 18, 1999.

"Policy-Based Network Architecture." From www.allot.com. pp. 1-11.

A. Dahlin et al. *EDDIE A Robust and Scalable Internet Server.* Ericsson Telecom AB, Stockholm, Sweden (May 1998).

Aron et al. "Efficient Support for P-HTTP in Cluster-Based Web Servers." Proc. Of 1999 Annual Usenix Technical Conference, Monterey, CA, Jun. 1999.

Aron et al. "Scalable Content-aware Request Distribution in Cluster-based Network Server." Proc. Of the 2000 Annual Usenix Technical Conference, San Diego, CA, Jun. 2000.

Aron, Mohit. "Scalable Content-aware Request Distribution in Cluster-based Network Servers." http://softlib.rice.edu/softlib/scalableRD.html. Department of Computer Science, Rice University.

Brochure entitled, *ACEdirector™ 8-PORT 20/200 MBPS ETHERNET WEB SWITCH*. Alteon WebSystems, San Jose, CA (1999).

Brochure entitled, *Enhancing Web User Experience with Global Server Load Balancing*. Alteon WebSystems, San Jose, CA (Jun. 1999).

Brochure entitled, *The Next Step in Server Load Balancing*. Alteon WebSystems, San Jose, CA (Nov. 1999).

Hansen et al., Dynamic Adaptation of Network Connections in Mobile Environments, *IEEE Internet Computing,* Jan.-Feb. 1998.

http://w3.enterlib.ibm.com:80/cgi-bin/bookmgr/books/F1AF7001/1.3.1.2; 1.3.1.2.5 Virtual IP Addressing (VIPA); Excerpt from IP Configuration for OS/390, pp. 1-4 (1998).

http://w3.enterlib.ibm.com:80/cgi-bin/bookmgr/books/F1AF7001/1.3.2; 1.3.20 DEVICE and LINK Statement-Virtual Devices (VIPA); Excerpt from IP Configuration of OS/390, pp. 1-3 (1998).

http://w3.enterlib.ibm.com:80/cgi-bin/bookmgr/books/F1AF7001/1.3.2; 1.3.23. HOME Statement; Excerpt From IP Configuration for OS/390, pp. 1-6 (1998).

Mac Devine. Presentation entitled, *Networking and the Parallel Sysplex*. OS/390 Expo and Performance Conference (Oct. 22, 1999).

Mac Devine. Presentation entitled, *The Parallel Sysplex: Concepts and Considerations*. Share Session 3406 (Mar. 5, 2000).

Pai et al. *Locality-Aware Request Distribution in Cluster-based Network Servers*. Proceedings of the 8th International Conference on Architectural Support for Programming Languages and Operating Systems (ASPLOS VIII), San Jose, CA, Oct. 1998.

* cited by examiner

METHODS, SYSTEMS AND COMPUTER PROGRAM PRODUCTS FOR SERVER BASED TYPE OF SERVICE CLASSIFICATION OF A COMMUNICATION REQUEST

RELATED APPLICATIONS

The present application is a continuation-in-part of application Ser. No. 09/645,651, filed Aug. 24, 2000, entitled "Methods, Systems and Computer Program Products for Processing an Event Based on Policy Rules Using Hashing" which is incorporated herein by reference as if set forth in its entirety.

FIELD OF THE INVENTION

The present invention relates to type of service classification and more particularly to type of service classification associated with communications over a network.

BACKGROUND OF THE INVENTION

Computer networks have grown increasingly complex with the use of distributed client/server applications, mixed platforms and multiple protocols all in a single physical backbone. The control of traffic on networks is likewise moving from centralized information systems departments to distributed work groups. The growing utilization of computer networks is not only causing a move to new, high speed technologies, but is, at the same time, making the operation of computer networks more critical to day to day business operations. The use of quality of service (QoS) criteria for managing and/or contracting communication service level agreements (SLAs) is becoming increasingly common in networks, such as networks supporting Internet protocol (IP) communications.

The Internet Engineering Task Force (IETF) has proposed a set of policy schemas (object oriented models of policy classes and policy attributes) and a policy framework for managing future networks. The IETF proposed policy based networking technology is described in the Internet draft entitled "Policy Core LDAP Schema," draft-IETF-policy-core-schema-07.txt, Jul. 14, 2000 ("IETF proposal"). Among other things, the IETF proposal includes three policy classes referred to as policy Rule, policy Action and policy Condition respectively. A policy rule (class policyRule) has the following semantics: "If Condition then Action." In other words, the actions (class policyAction) specified by a policy rule are to be performed/executed only if the policy condition (class policyCondition) evaluates to TRUE (i.e., is met).

Stated differently, the IETF proposal provides policy conditions which represent a set of criteria that are used to identify various groupings, such as host(s), routing, application(s), based on which, if the condition evaluates to TRUE, appropriate actions are performed. The application condition group, for example, includes, among other things, an attribute that is used to identify the content of the application data to be used in the policy condition evaluation. This data, for Web requests, generally represents the Universal Resource Indicator (URI) portion of the Universal Resource Locator (URL) or the directory where the object of the request is located.

Implementation of such policy rule based operations in time sensitive environments, such as a high speed network environment, can place time critical demands on processing capabilities of various network communication server devices. Rapid detection of the application data type or other aspects of a communication packet processed by a communication server may be critical, for example, where service differentiation by different data types is utilized to guarantee SLAs related to QoS.

As an example, in the environment of the worldwide Web (Web or Internet), each hypertext transport protocol (HTTP) type request can result in a different data type(s) being sent to a requesting client device from a server device. For example, an HTTP request may call for video/audio data streaming, transaction oriented data, File Transfer Protocol (FTP) data, etc. Different data types may require different service levels to be assigned while the data is being transmitted to the client. For instance, FTP type data generally requires low loss but is not highly sensitive to delays whereas video/audio data will typically be sensitive to delay but not to loss. Additionally, application specific information other than a URL, for example, the requesting user associated with a request, may be associated with a desired QoS.

Conventional systems implementing QoS criteria typically process requests with a type of service which is network based (as contrasted with endpoint (i.e., server or client) based or utilize unique TCP/IP port numbers to differentiate types of service required. Such an approach may fail to integrate all the desired elements to achieve consistent response time, for example, when processing web-based transactions which benefit from prioritization to achieve consistent response times. For example, such web-based requests are all typically managed at the same priority level which may result in downloads, browses and business transactions being managed at the same priority level with both network and server resources being applied equally across what may preferably be treated as three different priorities of workload. Such a result may be encountered in conventional systems as all such web-based requests typically travel through the network and arrive at the server using the same port (generally port 80 or port 443 if secured socket layer (SSL) communications are being used).

An example of such a QoS product is the Web Traffic Express product available from IBM corporation of Armonk, N.Y. which generally provides web associated quality of service in a separate device positioned between the server/client (endpoint) device and the communication network. This separate device may then determine network qualities of service but generally does not synchronize its setting with the actual server/client device providing an application using web communications and/or database server functions. Thus, the Web Traffic Express product generally does not provide full correlation between network and server resources. Similarly, web QoS products available from Hewlett Packard Corporation and Cisco Corporation generally do not integrate with server-based workload management processes. They also typically execute on the application level.

SUMMARY OF THE INVENTION

Embodiments of the present invention include methods, systems and computer program products for type of service classification of a communication request for an application executing on a server. An application plug-in associated with the application is provided in an operating system kernel of the server. The application plug-in receives the communication request and obtains application level information from the received communication request. The application plug-in further assigns a type of service classification to the received communication request based on the obtained application level information and provides the assigned type of service classification information for the communication request to a process executing on the server for processing communications from the server responsive to the communication request.

The communication request may be a TCP/IP protocol communication in which case the application level information from the received communication request is level 5 or above information. The assigned type of service classification information for the communication request may then be provided to a TCP/IP kernel executing on the server.

In further embodiments of the present invention, the information provided to the TCP/IP kernel includes one or more of a source IP address, a destination IP address and a TCP/IP port number associated with the communication request as an associated identification for the assigned type of service. The TCP/IP kernel in such embodiments associates the assigned type of service with a plurality of communications from the server responsive to the received communication request based on the provided source IP address, destination IP address and TCP/IP port number. For example, an HTTP request may request transfer of a "page" which is large enough to extend across multiple outgoing communication packets from the server. Each of these outgoing communication packets may provide the designated type of service determined from the incoming communication request.

In particular embodiments, the assigned type of service classification may be associated with one or more new thread instances initiated on the server based on the obtained application level information. In further embodiments, the assigned type of service classification may be associated across sockets API for associated connections based on the obtained application level information.

In other embodiments of the present invention, the type of service classification is assigned based on workload management information associated with the server. Information associated with the received communication may be provided to a workload management process executing on the server and the workload management information may then be received from the workload management process. The assigned type of service classification may assign one or more of a central processing unit (CPU) priority allocation, a memory allocation or an input/output (I/O) bandwidth allocation to the received communication request.

In further embodiments of the present invention, type of service information is included in communications from the server responsive to the communication request based on the assigned type of service classification. The type of service information is usable by a network communicating the communications from the server for prioritization of traffic flows on the network. The type of service information may be selected to provide substantially uniform priority in handling the communication request by both the server and the network or may provide a different type of service for network prioritization of communications from the server than the assigned type of service classification provides from the server for processing of the communication request. For example, a separate connection may be provided for communications from the server responsive to the communication request to support the different type of service for network prioritization.

The communication request may be a web-based request and the application may be a web application. The web-based request may be a hypertext transport protocol (HTTP) request and the application level information may include a universal resource locator (URL) of the HTTP request. The URL in such embodiments may then be parsed on the server to make a policy based determination of the type of service classification for the communication request. The application level information may include an identification of a user initiating the communication request at a source device of the communication request. In further embodiments, the application level information may be obtained from a cookie contained in the communication request. For example, the identification of a user initiating the communication request may be obtained from a cookie in the communication request.

In other embodiments of the present invention, systems are provided for type of service classification of a communication request for an application executing on a server. The system includes a communication process executing on the server that processes communications between the server and a communication network associated with the communication request based on an associated type of service classification. The system further includes an application plug-in process associated with the application in an operating system kernel of the server that obtains application level information from the received communication request, assigns the type of service classification to the received communication request based on the application level information and provides the assigned type of service classification to the communication process. In particular embodiments, the system further includes a workload management process executing on the server that receives information about the communication request from the application plug-in process and provides information related to server resources for use in allocating server resources to the communication process for use in processing communications between the server and a communication network associated with the communication request based on an associated type of service classification.

While the invention has been described above primarily with respect to the method aspects of the invention, both systems and/or computer program products are also provided.

DETAILED DESCRIPTION OF PREFERRED EMBODIMENTS

Figure 1:
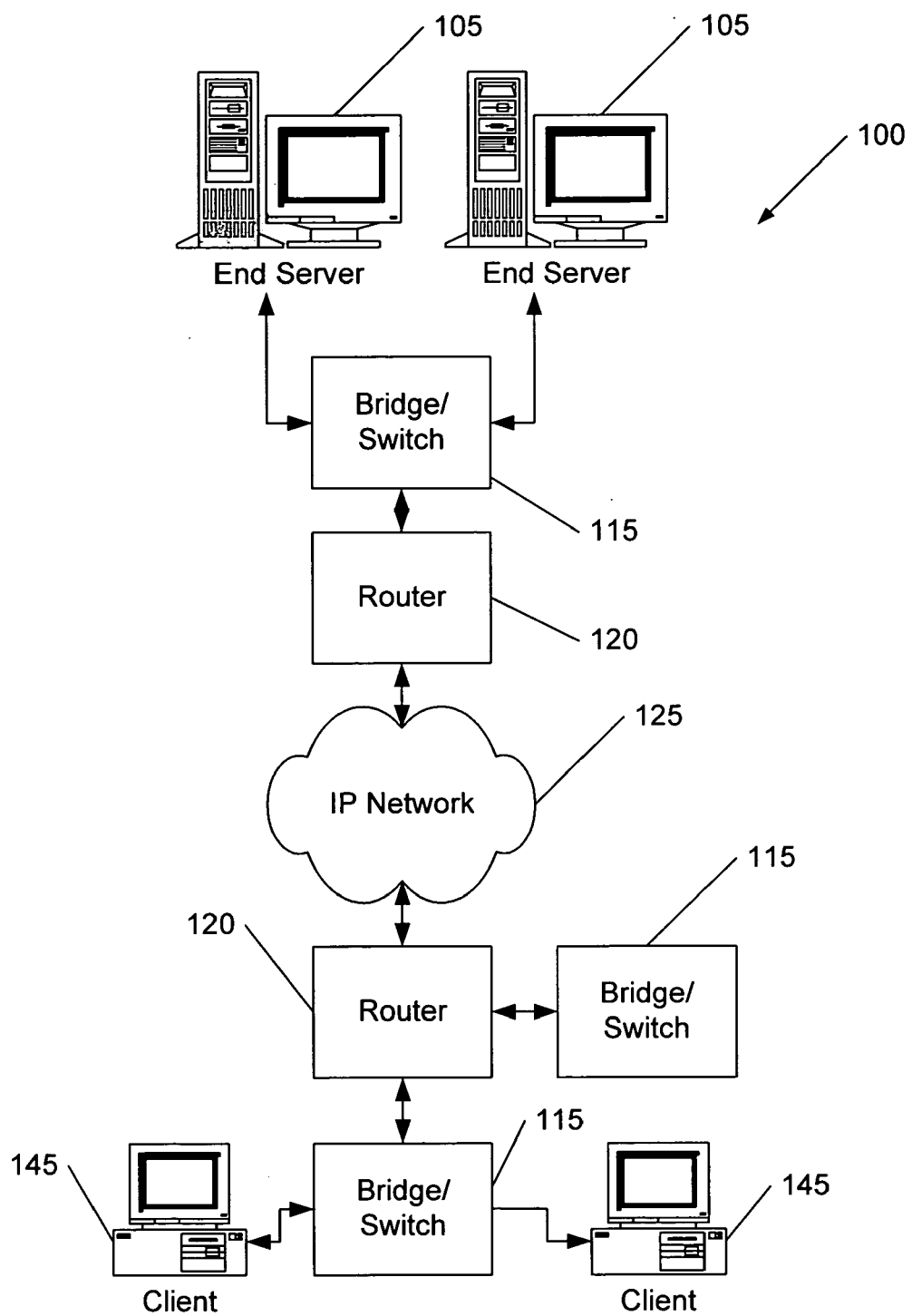
FIG. 1 is a block diagram of a network environment in which the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, on partly on the user's computer and partly on a remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Referring first to the block diagram illustration of FIG. 1, a network environment in which the present invention may be implemented will be generally described. As illustrated in FIG. 1, the communication network 100 includes a plurality of connecting nodes and endpoint nodes. As shown in FIG. 1, two endpoint servers 105 and two clients 145 are shown which are endpoints on the communication network 100. However, additional devices may be connected and a single computer device may serve as both a server and a client in different transactions and may further function as a connecting node between network 100 and another network. Accordingly, as used herein, the term "server" will refer to an endpoint node with respect to a communication request as contrasted with a router or bridge device.

As shown in FIG. 1, endpoint servers 105 connect through a bridge switch 115 and a router 120 to the IP network 125. Clients 145 are also connected to the IP network 125 through a bridge/switch 115 and a router 120. Additional bridge/switches 115 and routers 120 may be included in the IP network 125 as will be understood by one of ordinary skill in the art.

The communication network 100 may be provided by wired or wireless links using a variety of physical layer media and still stay within the teachings and scope of the present invention. Furthermore, while the present invention is described primarily in the context of communication networks and control of communication traffic on such networks, the present invention is not so limited and may be utilized beneficially in processing events based on type of service classifications, particularly in environments where processing speed for automatically identifying and executing an appropriate type of service is important. For example, fast methodologies for classifying Web based communication requests (such as those designated by an HTTP address) for assignment of appropriate QoS based on policy rules is desirable for use with communication servers handling communications over networks such as the communication network 100. The routers 120 may also operate to provide appropriate service levels to packets routed through the respective routers 120 based on network policy rules.

Type of service classification for processing of communication requests may be beneficially implemented in endpoint devices such as servers 105 or clients 145. Such capabilities may be particularly beneficial in light of emerging network trends where service differentiation of different data types is important in guaranteeing service level agreement (SLA) performance. Various embodiments of the present invention, as will be described herein, may provide communication servers which classify a Web request based, for example, on a policy definition, which classification may be used to assign an appropriate type of service for a request once a matching policy rule is found. This approach may reduce the overall number of policy rules that need to be evaluated for each event and processing of rules efficiently and in real time may be implemented for processing Web requests.

Figure 2:
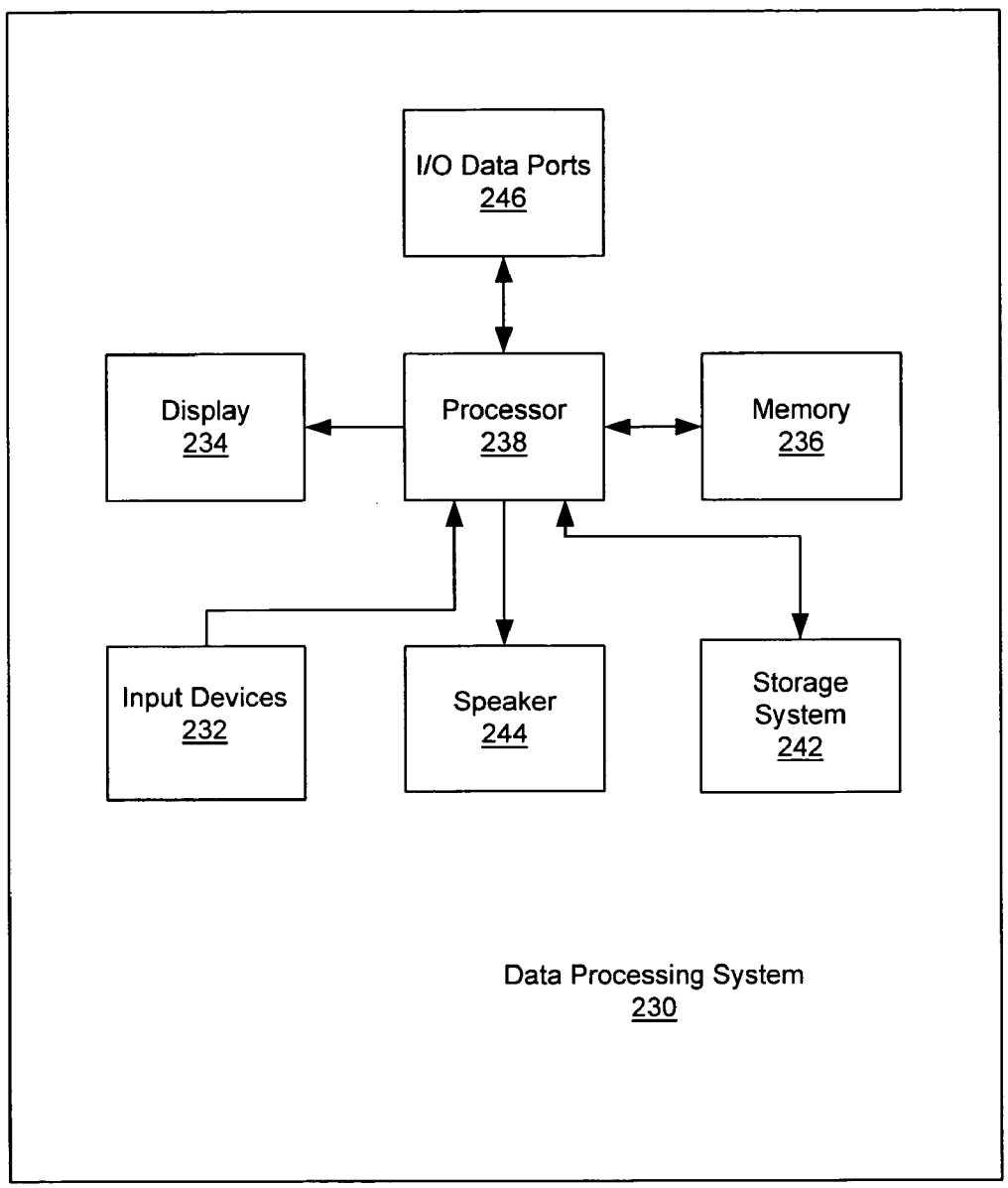
FIG. 2 is a block diagram of data processing systems according to embodiments of the present invention.

The present invention will now be further described with reference to the block diagram of FIG. 2 which illustrates data processing systems according to embodiments of the present invention. As illustrated in FIG. 2, the system 230 may include input device(s) 232 such as a keyboard or keypad, a display 234, and a memory 236 that communicate with a processor 238. The memory 236 can include, but is not limited to, the following types of devices: cache, ROM, PROM, EPROM, EEPROM, flash memory, SRAM, and DRAM. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port(s) 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
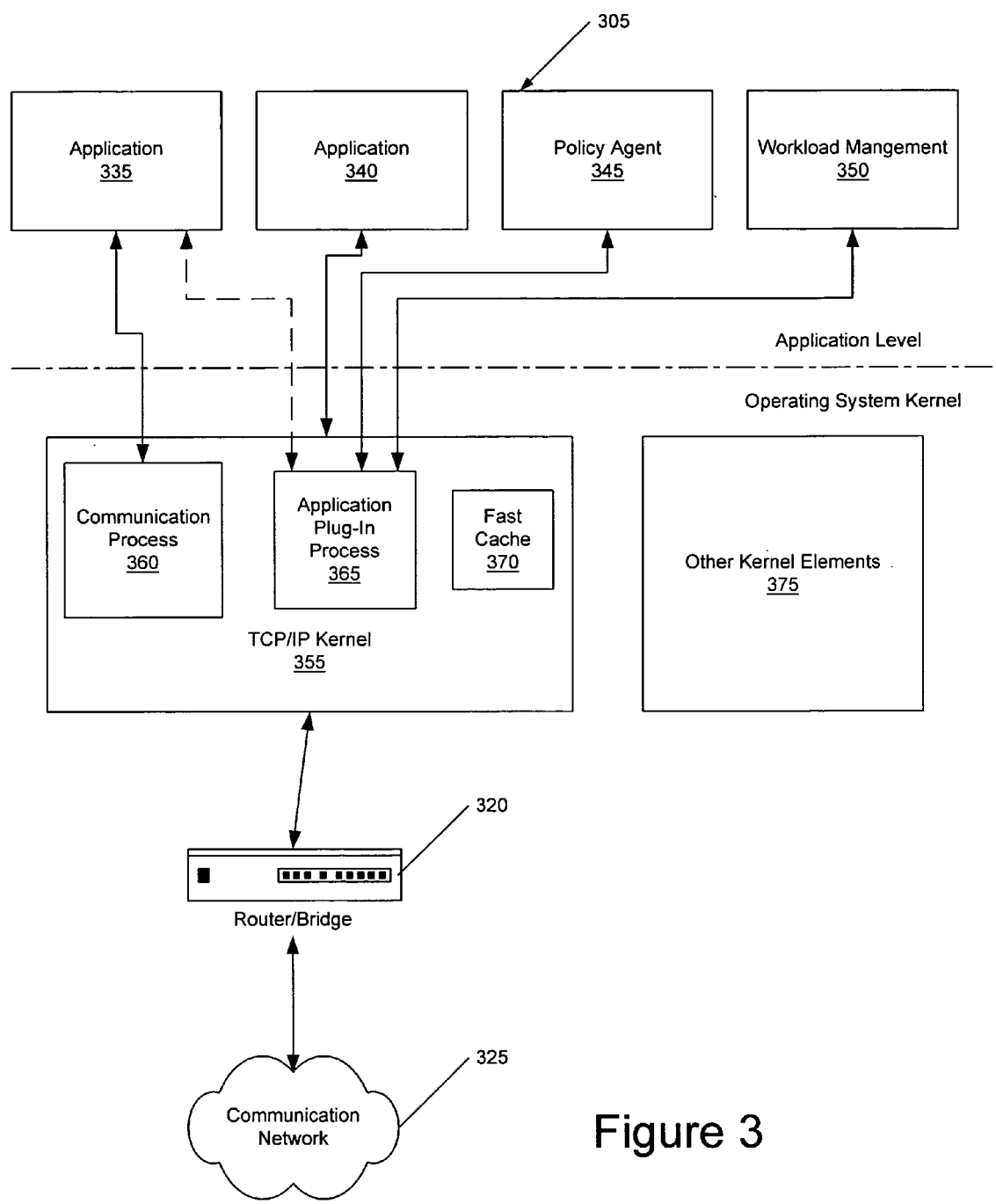
FIG. 3 is a more detailed block diagram of data processing systems according to embodiments of the present invention.

FIG. 3 is a block diagram of a data processing system that illustrates systems, methods, and computer program products in accordance with embodiments of the present invention. As shown in the embodiments of FIG. 3, the server (or client device acting as a server in that it is receiving communication requests which result in outgoing communications initiated by an application executing thereon) 305 includes application level processes and processes executing in the operating system kernel. As shown in FIG. 3, two exemplary applications supporting communications over the communication network 325, identified as application 335 and application 340, are illustrated. Furthermore, a policy agent 345 and workload management process 350 are shown as application level processes on the server 305. For the illustration of FIG. 3, the communicating applications 335, 340 are shown as communicating with the communication network 325 using a TCP/IP protocol. Thus, a TCP/IP kernel 355 is shown as being included in the operating system kernel of the server 305. It is to be understood that other kernel elements 375 are typically also found on the server 305, which other kernel elements 375 may further support communications with applications over the communication network 325 using other layered protocols.

The TCP/IP kernel 355, as shown in FIG. 3, communicates with the communication network 325 through a router/bridge device 320. Where the router/bridge device 320 is a router, it typically routes communications packets based on level 4 information, such as destination IP address. Where the router/bridge device 320 is a bridge, it may process communications within a network node using level 3 information, such as machine identification number, rather than level 4 IP address information.

As shown in FIG. 3, the TCP/IP kernel 355 includes a communication process 360. The communication process 360 executes on the server 305 to process communications between the applications 335, 340 of the server 305 and the communication network 325. Such communications are typically initiated responsive to an incoming communication directed to one of the applications 335, 340 which communication initiates subsequent outgoing communications from the server 305 based on content provided by the respective applications 335, 340 responsive to the incoming communication request.

Thus, the communication process 360 may support incoming communication request processing as well as processing of responsive communications from the server 305. More particularly, in accordance with embodiments of the present invention, the communication process 360 processes such outgoing communications from the server 305 based on an associated type of service classification defined for such communications.

An application plug-in process 365 is provided that assigns the type of service classification. A single application plug-in process 365 is illustrated in FIG. 3 which is associated with the application 335 as indicated by the dotted line of FIG. 3. It is to be understood that in various embodiments of the present invention, a separate application plug-in process may be provided for each of a plurality of applications supporting communications with the communication network 325. Alternatively, an application plug-in process 365 may be associated with a type of application, a plurality of instances of which type of application may be executing on the server 305.

The application plug-in process 365 obtains application level information from the received communication request. For example, in the context of a TCP/IP protocol communication as illustrated in FIG. 3, the application plug-in process 365 obtains level 5 or above information from the received communication request. The application plug-in process 365 further assigns the type of service classification to the received communication request based upon the application level information it obtains and provides the assigned type of service classification to the communication process 360.

Also shown in the TCP/IP kernel 355 is a fast cache 370, such as a fast response cache accelerator (FRCA), which may support communications, such as web type communications. Such caches are known, for example, for use with HTTP type requests based upon a URL associated with a "page" request. The URL information is an example of application level information which may be utilized by the application plug-in process 365 to assign a type of service. Accordingly, operations of the application plug-in process 365 may be beneficially coordinated with those associated with the fast cache 370 in processing cache supported communications.

While the workload management process 350 is shown in the application level, it may also execute in part or entirely as an operating system level process, for example, in the operating system kernel. The workload management process 350 receives information about the communication request from the application plug-in process 365 and provides information related to server resources. This server resource information may be used in allocating server resources to the communication process for use in processing communications based on an associated type of service classification. The workload management process 350 may do so by providing the workload information to the application plug-in process 365 for use in determining the assigned type of service classification or workload information may be provided directly to the communication process 360 and utilized in combination with type of service classification information from the application plug-in process 365.

Also shown in FIG. 3 is a policy agent 345 which may provide policy rule information for use by the application plug-in process 365 for identifying a type of service. Such a policy rules based approach to type of service determinations using hashing is described, for example, in application Ser. No. 09/645,651 which was incorporated by reference previously herein.

As will be appreciated by those of skill in the art, the operating system in which the present invention is incorporated may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

Figure 4:
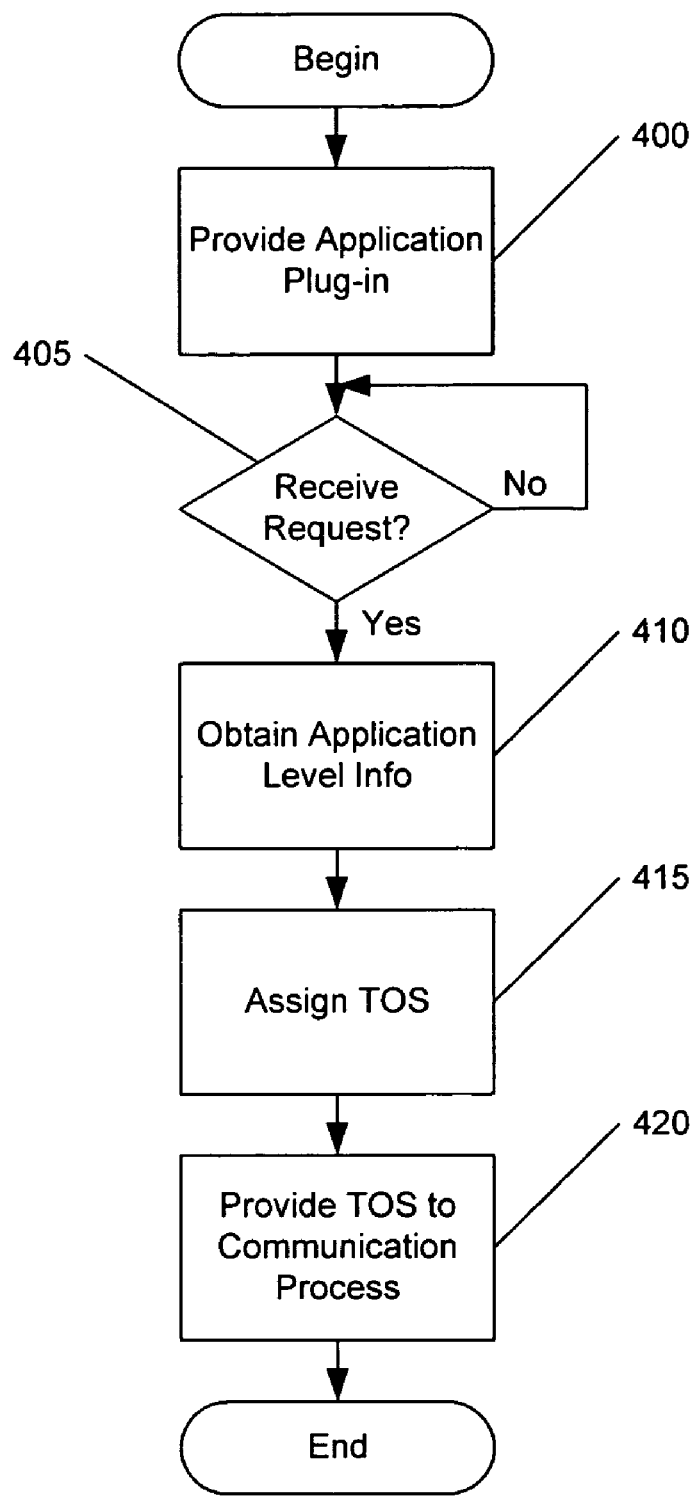
FIG. 4 is a flowchart illustrating operations according to embodiments of the present invention.

Operations according to various embodiments of the present invention will now be described further with reference to the flowchart illustrations of FIGS. 4–5. Operations begin with reference to FIG. 4 at block 400 when an application plug-in associated with an application executing on a server is provided in an operating system kernel of the server. The application plug-in subsequently receives communication requests including a communication request for the associated application executing on the server (block 405). Application level information from the received communication request is obtained by the application plug-in (block 410). For example, with reference to a TCP/IP protocol communication, the application level information would correspond to level 5 or above information obtained from the received communication request.

A type of service classification is assigned to the received communication request based on the obtained application level information (block 415). The assigned type of service classification information for the communication request is provided to a process executing on the server for processing communications from the server responsive to the communication request (block 420). For example, the assigned type of service classification information for the communication request may be provided to a TCP/IP kernel executing on the server which processes communications using the TCP/IP protocol.

In addition to providing the type of service classification information, the application plug-in may further provide the TCP/IP kernel a source IP address, a destination IP address and a TCP/IP port number associated with the communication request as an identification for the assigned type of service. Using this source and destination IP address information and the port number, the TCP/IP kernel in various embodiments of the present invention associates the assigned type of service with a plurality of communications from the server responsive to the received communication request. Thus, a type of service once assigned to a request, may be applied by the TCP/IP kernel supporting a TCP/IP communication stack to a plurality of output packets initiated responsive to the received communication request.

For example, the TCP/IP kernel acting as a communication process 360 may associate the assigned type of service classification with one or more thread instances initiated on the server based on the obtained application level information. The type of service markings may, thus, be propagated to new threads/processes within the server with those new threads/processes established to include the assigned type of service markings across the sockets API for associated connections.

Where policy based rules are used to assign the type of service classification at block 415 using both source and destination IP address and port number along with application level information (for example, a URL or other classification mechanism), a fine grained differentiation of different service classes by transaction type may be provided in accordance with embodiments of the present invention. In other words, in various embodiments of the present invention, for example, web-based communications embodiments, communication processing transactions may be classified by parsing the URL on the server to determine a policy-based priority for each class as to how it is to be processed on the server (which may include allocation of resources such as central process unit (CPU) resources, allocation of the memory resources and allocation of input/output (I/O) bandwidth. Furthermore, such prioritization may be maintained across responses sent for each request.

As will now be described with reference to the flowchart illustration of operations according to further embodiments of the present invention in FIG. 5, such prioritization may also be coordinated with network prioritization by linking the classification policy for network prioritization with the server policies for workload prioritization. Doing so may improve consistency between the ways that required network and server resources are managed so that the most important work may receive preferences both on the server and across the network carrying the communications as soon as the respective prioritized transactions are recognized. In the case of secured transactions, for example, using SSL (port 443), the server prioritization may actually be the first opportunity for a transaction (communication request) to be classified through inspection of the contents of the packets, especially if the transmitting user did not choose to distribute the encryption keys needed to do such content based prioritization to remote platforms. Distribution of such keys to remote platforms could reduce the integrity of the protection provided by the secured communication protocol. Linking the input classification of a communication request and prioritization (for server workload management) to an outbound classification and prioritization (for network resource management) using the same (or a related) policy may further help provide end-to-end consistent resource management according to the QoS/SLA requirements associated with the communication request.

Such operations will now be described with reference to various embodiments in FIG. 5. Operations begin at block 500 when application level information is obtained from a received communication request. For the embodiments illustrated in FIG. 5, information associated with the received communication is provided to a workload management process executing on the server (block 505). For example, the application plug-in process 365 may provide such information to the workload management process 350. Workload management information is received from the workload management process responsive to the provided information associated with the received communication (block 510). The workload manager may thus be utilized on the server to support enforcement of policy rule based type of service classification with respect to resources such as CPU priority, memory and I/O bandwidth allocation consistent with the goals and rights of users associated with the communication request, such as expectations for response time and/or throughput of supported communications. The type of service classification may then be assigned based on the workload management information associated with the server received from the workload management process (block 515) and provided to the communication process (block 520).

In a further aspect of various embodiments of the present invention, type of service markings are provided in outbound replies (consistent with the inbound type of service classification generated responsive to the receipt of a communication request) to prioritize traffic across the network, such as a local area network (LAN) and/or a wide area network (WAN) handling the responsive communications. Such marking of outbound communications, as will be described, may facilitate balancing resource allocation consistent with customer policy for workload importance and coordinating server-based actions with networking mechanisms like traffic prioritization giving differentiated services based on type of service markings.

Figure 5:
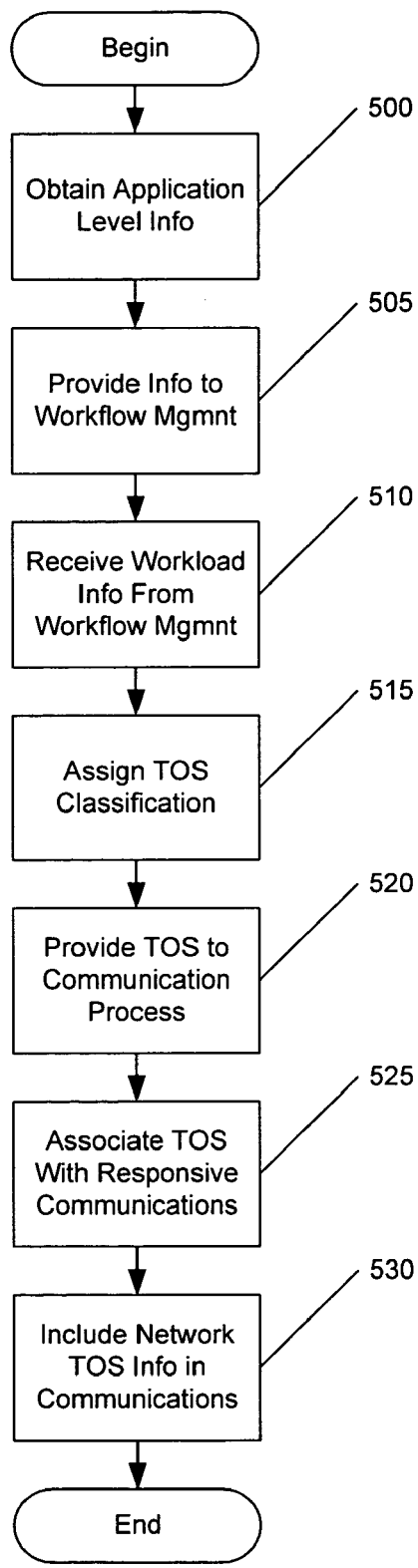
FIG. 5 is a flowchart illustrating operations according to further embodiments the present invention.

As shown in FIG. 5, type of service information is associated with communications from the server which are generated responsive to the communication request (block 525). The type of service information is based on the assigned type of service classification generated responsive to the received communication request. As described above, the type of service information, which is preferably usable by a network communicating the communications from the server for prioritization of traffic flows on the network, is incorporated in the responsive communications (block 530). The selection of the type of service information may be planned to provide a consistent service, such as the same priority, service both at the server and the network level.

Alternatively, the network type of service information may be selected to provide a different type of service for network prioritization of communications from the server than the assigned type of service classification provides from the server in processing of the communication request on the server itself. For example, on the server, outbound type of service information markings could be overridden by applying a different set of filter rules on the outbound traffic.

By way of further example, an inbound communication request could spawn a separate connection for streaming video as a result of a commercial transaction. More generally, a separate connection may be provided for communications from the server responsive to the communication request to support a type of service for network prioritization of communications from the server which is different from a type of service the server itself provides in processing the communication request.

It is further to be understood that, while the examples above referred to URL as the application level information, other application level information not normally utilized by the communication protocol stack may beneficially be used in keeping with the present invention. For example, an identification of a user initiating the communication request at a source device of the communication request may be determined as the application level information. In a web-type communication context, the application level information could be obtained from a cookie contained in the communication request. In fact, for certain applications, an identification of a user initiating a communication request may itself be contained from a cookie obtained in the communication request.

As described generally above, the various embodiments of the present invention provide for server based quality of service classification. This approach may provide correlation between server and network based prioritization. Furthermore, by providing the application plug-in in an operating system kernel, classification operations may be done efficiently and may further be done in a manner consistent with existing communication caching and classification mechanisms already implemented in a server. The type of service classification may also be integrated with workload management processes on the server so as to potentially better manage resource and bandwidth allocations at the server.

The flowcharts and block diagrams of FIGS. 1 through 5 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposed of limitation, the scope of the invention being set forth in the following claims.

That which is claimed:

1. A method for type of service classification of a communication request for an application executing on a server, the method comprising the steps of:
providing an application plug-in associated with the application, the application plug-in being in an operating system kernel of the server;
wherein the application plug-in performs the following steps:
receiving the communication request;
obtaining application level information from the received communication request;
assigning a type of service classification to the received communication request based on the obtained application level information; and
providing the assigned type of service classification information for the communication request to a process executing on the server for processing communications from the server responsive to the communication request.

2. The method of claim 1 wherein the communication request is a TCP/IP protocol communication and wherein the step of obtaining application level information from the received communication request comprises the step of obtaining level 5 or above information from the received communication request.

3. The method of claim 2 wherein the step of providing the assigned type of service classification information for the communication request to a process executing on the server comprises the step of providing the assigned type of service classification information for the communication request to a TCP/IP kernel executing on the server.

4. The method of claim 3 wherein the step of providing the assigned type of service classification information for the communication request to a TCP/IP kernel further comprises the step of providing a source IP address, a destination IP address and a TCP/IP port number associated with the communication request to the TCP/IP kernel as an associated identification for the assigned type of service and wherein the method further comprises the step performed by the TCP/IP kernel of associating the assigned type of service with a plurality of communications from the server responsive to the received communication request based on the provided source IP address, destination IP address and TCP/IP port number.

5. The method of claim 4 further comprising the step of associating the assigned type of service classification with a new thread instance initiated on the server based on the obtained application level information.

6. The method of claim 5 wherein the step of associating the assigned type of service classification with a new thread instance initiated on the server based on the obtained application level information further comprises the step of associating the assigned type of service classification across a sockets API for associated connections based on the obtained application level information.

7. The method of claim 2 wherein the step of assigning a type of service classification further comprises the step of assigning the type of service classification based on workload management information associated with the server.

8. The method of claim 7 further comprising the steps of:
providing information associated with the received communication to a workload management process executing on the server; and receiving the workload management information from the workload management process.

9. The method of claim 7 wherein the assigned type of service classification assigns at least one of a central processing unit (CPU) priority allocation, a memory allocation or an input/output (I/O) bandwidth allocation to the received communication request.

10. The method of claim 2 further comprising the step of including type of service information in communications from the server responsive to the communication request based on the assigned type of service classification, the type of service information being usable by a network communicating the communications from the server for prioritization of traffic flows on the network.

11. The method of claim 10 wherein the type of service information provides a different type of service for network prioritization of communications from the server than the assigned type of service classification provides from the server for processing of the communication request.

12. The method of claim 11 wherein the method further comprises the step of providing a separate connection for communications from the server responsive to the communication request to support the different type of service for network prioritization of communications from the server than the assigned type of service classification provides from the server for processing of the communication request.

13. The method of claim 2 wherein the communication request is a web-based request and the application is a web application.

14. The method of claim 13 wherein the web-based request is a hypertext transport protocol (HTTP) request and wherein the application level information includes a universal resource locator (URL) of the HTTP request and wherein the assigning step further comprises the step of parsing the URL on the server to make a policy based determination of the type of service classification for the communication request.

15. The method of claim 14 wherein the assigned type of service classification assigns at least one of a central processing unit (CPU) priority allocation, a memory allocation or an input/output (I/O) bandwidth allocation to the received communication request.

16. The method of claim 14 wherein the step of providing the assigned type of service classification information for the communication request to a process executing on the server comprises the step of providing the assigned type of service classification information for the communication request to a TCP/IP kernel executing on the server and wherein the method further comprises the step performed by the TCP/IP kernel of associating the assigned type of service with a plurality of communications from the server responsive to the received communication request.

17. The method of claim 16 further comprising the step of including type of service information in communications from the server responsive to the communication request based on the assigned type of service classification, the type of service information being usable by a network communicating the communications from the server for prioritization of traffic flows on the network.

18. The method of claim 13 wherein the application level information includes an identification of a user initiating the communication request at a source device of the communication request.

19. The method of claim 13 wherein the application level information is obtained from a cookie contained in the communication request.

20. A system for type of service classification of a communication request for an application executing on a server, the system comprising:
    a communication process executing on the server that processes communications between the server and a communication network associated with the communication request based on an associated type of service classification; and
    an application plug-in process associated with the application and being in an operating system kernel of the server that obtains application level information from the received communication request, assigns the type of service classification to the received communication request based on the application level information and provides the assigned type of service classification to the communication process.

21. The system of claim 20 further comprising a workload management process executing on the server that receives information about the communication request from the application plug-in process and provides information related to server resources for use in allocating server resources to the communication process for use in processing communications between the server and a communication network associated with the communication request based on an associated type of service classification.

22. A system for type of service classification of a communication request for an application executing on a server, the system comprising:
    a communication process executing on the server that processes communications from the server responsive to the communication request; and
    an application plug-in associated with the application and being in an operating system kernel of the server; wherein the application plug-in further comprises:
    means for receiving the communication request;
    means for obtaining application level information from the received communication request;
    means for assigning a type of service classification to the received communication request based on the obtained application level information; and
    means for providing the assigned type of service classification information for the communication request to the communication process.

23. The system of claim 22 wherein the communication request is a TCP/IP protocol communication and wherein the means for obtaining application level information from the received communication request comprises means for obtaining level 5 or above information from the received communication request.

24. The system of claim 23 wherein the means for providing the assigned type of service classification information for the communication request to the communication process comprises means for providing the assigned type of service classification information for the communication request to a TCP/IP kernel executing on the server.

25. The system of claim 23 wherein the means for assigning a type of service classification further comprises means for assigning the type of service classification based on workload management information associated with the server.

26. The system of claim 25 further comprising:
    means for providing information associated with the received communication to a workload management process executing on the server; and
    means for receiving the workload management information from the workload management process.

27. The system of claim 23 further comprising means for including type of service information in communications from the server responsive to the communication request based on the assigned type of service classification, the type of service information being usable by a network communicating the communications from the server for prioritization of traffic flows on the network.

28. The system of claim 23 wherein the communication request is a web-based-request and the application is a web application.

29. The system of claim 28 wherein the web-based request is a hypertext transport protocol (HTTP) request and wherein the application level information includes a universal resource locator (URL) of the HTTP request and wherein the means for assigning further comprises means for parsing the URL on the server to make a policy based determination of the type of service classification for the communication request.

30. The system of claim 29 wherein the assigned type of service classification assigns at least one of a central processing unit (CPU) priority allocation, a memory allocation or an input/output (I/O) bandwidth allocation to the received communication request.

31. The system of claim 29 wherein the means for providing the assigned type of service classification information for the communication request to the communication process comprises means for providing the assigned type of service classification information for the communication request to a TCP/IP kernel executing on the server and wherein the system further comprises the TCP/IP kernel, wherein the TCP/IP kernel further comprises means for associating the assigned type of service with a plurality of communications from the server responsive to the received communication request.

32. The system of claim 31 further comprising means for including type of service information in communications from the server responsive to the communication request based on the assigned type of service classification, the type of service information being usable by a network communicating the communications from the server for prioritization of traffic flows on the network.

33. A computer program product for type of service classification of a communication request for an application executing on a server, comprising: a computer-readable storage medium having computer-readable program code embodied in said medium, said computer-readable program code comprising:
application plug-in computer-readable program code associated with the application for execution, the application plug-in computer-readable program code being in an operating system kernel of the server;
wherein the application plug-in computer-readable program code further comprises:
computer-readable program code which receives the communication request;
computer-readable program code which obtains application level information from the received communication request;
computer-readable program code which assigns a type of service classification to the received communication request based on the obtained application level information; and
computer-readable program code which provides the assigned type of service classification information for the communication request to a process executing on the server for processing communications from the server responsive to the communication request.

34. The computer program product of claim 33 wherein the communication request is a TCP/IP protocol communication and wherein the computer-readable program code which obtains application level information from the received communication request comprises computer-readable program code which obtains level 5 or above information from the received communication request.

35. The computer program product of claim 34 wherein the computer-readable program code which provides the assigned type of service classification information for the communication request to the communication process comprises computer-readable program code which provides the assigned type of service classification information for the communication request to a TCP/IP kernel executing on the server.

36. The computer program product of claim 34 wherein the computer-readable program code which assigns a type of service classification further comprises computer-readable program code which assigns the type of service classification based on workload management information associated with the server.

37. The computer program product of claim 36 further comprising:
computer-readable program code which provides information associated with the received communication to a workload management process executing on the server; and
computer-readable program code which receives the workload management information from the workload management process.

38. The computer program product of claim 34 further comprising computer-readable program code which includes type of service information in communications from the server responsive to the communication request based on the assigned type of service classification, the type of service information being usable by a network communicating the communications from the server for prioritization of traffic flows on the network.

39. The computer program product of claim 34 wherein the communication request is a web-based request and the application is a web application.

40. The computer program product of claim 39 wherein the web-based request is a hypertext transport protocol (HTTP) request and wherein the application level information includes a universal resource locator (URL) of the HTTP request and wherein the computer-readable program code which assigns further comprises computer-readable program code which parses the URL on the server to make a policy based determination of the type of service classification for the communication request.

41. The computer program product of claim 40 wherein the assigned type of service classification assigns at least one of a central processing unit (CPU) priority allocation, a memory allocation or an input/output (I/O) bandwidth allocation to the received communication request.

42. The computer program product of claim 40 wherein the computer-readable program code which provides the assigned type of service classification information for the communication request to the communication process comprises computer-readable program code which provides the assigned type of service classification information for the communication request to a TCP/IP kernel executing on the server and wherein the computer program product further comprises TCP/IP kernel computer-readable program code which associates the assigned type of service with a plurality of communications from the server responsive to the received communication request.

43. The computer program product of claim 42 further comprising computer-readable program code which includes type of service information in communications from the server responsive to the communication request based on the assigned type of service classification, the type of service information being usable by a network communicating the communications from the server for prioritization of traffic flows on the network.

* * * * *